(12) United States Patent
Gouin

(10) Patent No.: US 11,242,922 B2
(45) Date of Patent: Feb. 8, 2022

(54) POWER TRANSMISSION DEVICE

(71) Applicant: Safran Transmission Systems, Colombes (FR)

(72) Inventor: Gilles Gaston Jacques Gouin, Moissy-Cramayel (FR)

(73) Assignee: Safran Transmission Systems, Colombes (FR)

( * ) Notice: Subject to any disclaimer, the term of this patent is extended or adjusted under 35 U.S.C. 154(b) by 204 days.

(21) Appl. No.: 16/554,992

(22) Filed: Aug. 29, 2019

(65) Prior Publication Data

US 2020/0072335 A1 Mar. 5, 2020

(30) Foreign Application Priority Data

Aug. 31, 2018 (FR) ...................................... 1857856

(51) Int. Cl.
*F16H 55/06* (2006.01)
*B23K 20/12* (2006.01)

(52) U.S. Cl.
CPC ........... *F16H 55/06* (2013.01); *B23K 20/122* (2013.01)

(58) Field of Classification Search
CPC .............................. F16H 55/06; B23K 20/122
See application file for complete search history.

(56) References Cited

U.S. PATENT DOCUMENTS

| | | | |
|---|---|---|---|
| 1,492,145 A * | 4/1924 | Talley | F16H 55/06 74/445 |
| 9,296,157 B1 * | 3/2016 | Handschuh | B29C 70/84 |
| 2007/0221438 A1 * | 9/2007 | Bernhard | F16H 55/12 180/444 |
| 2018/0180159 A1 | 6/2018 | Tu | |

* cited by examiner

*Primary Examiner* — Randell J Krug
(74) *Attorney, Agent, or Firm* — Blank Rome LLP

(57) ABSTRACT

An annular power transmission element with a longitudinal axis that has a first annular part, a second annular part with torque transmission means and a third annular part. The first, second and third annular parts are integral with each other. The first annular part and the third annular part are made of a first metallic material and the second annular part is made of a second metallic material having a density greater than the density of the first metallic material. The second annular part is locked longitudinally between the first annular part and the third annular part and radially on the first annular part, the first annular part is in contact with the third annular part and welded thereto.

11 Claims, 3 Drawing Sheets

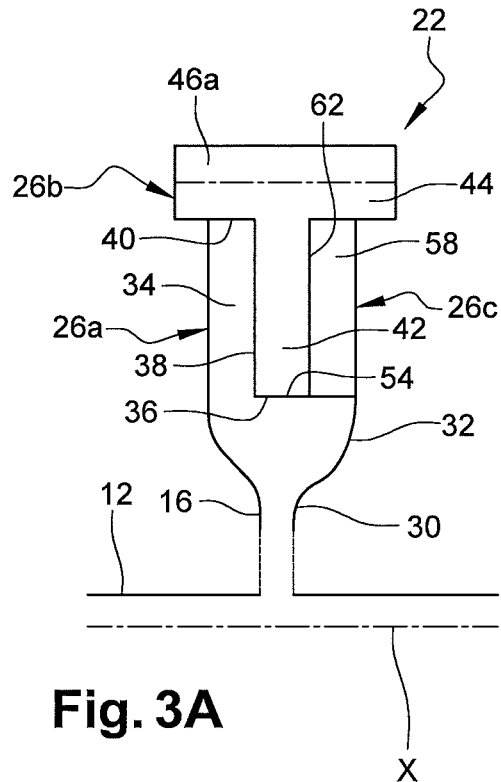
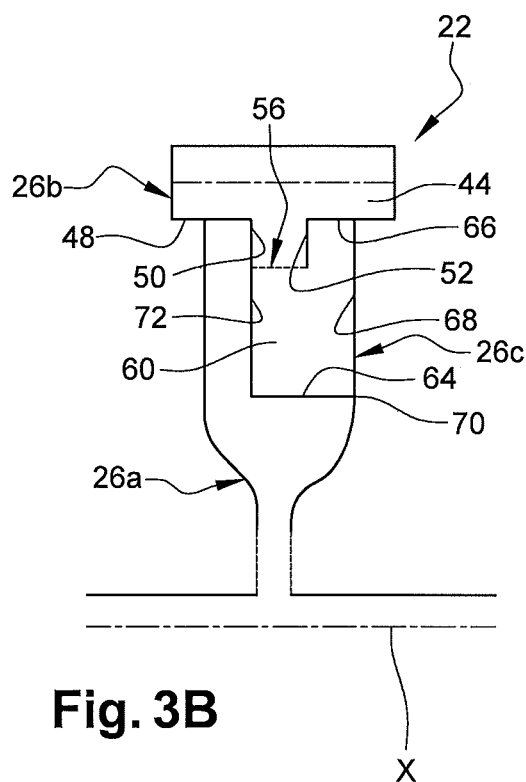
Fig. 3A
Fig. 3B
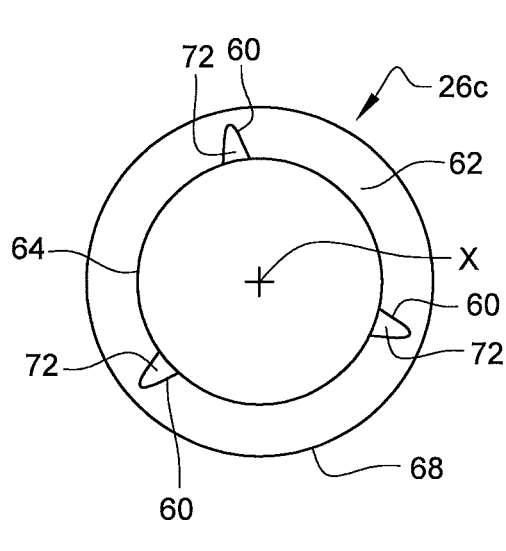
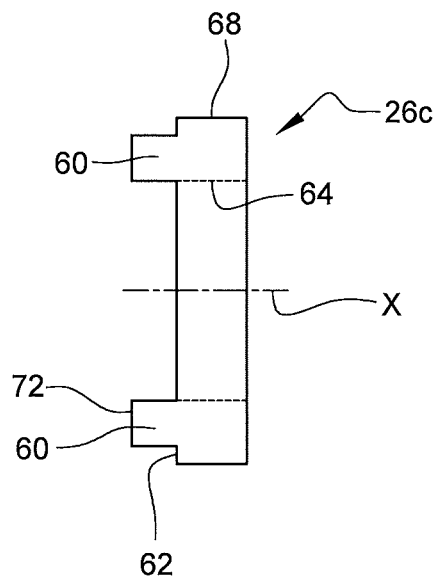
Fig. 4A
Fig. 4B

POWER TRANSMISSION DEVICE

CROSS-REFERENCE TO RELATED APPLICATION

This application claims the benefit of French Patent Application No. 1857856, filed on Aug. 31, 2018, the content of which is incorporated by reference herein.

TECHNICAL FIELD

The present invention relates to a power transmission element, more particularly made of two materials.

BACKGROUND

FIG. 1 shows an annular power transmission element 10 of a known type that is made of a single material, such as steel. It includes a tubular barrel 12 with inner grooves 14 for coupling the power transmission element to a shaft with matching grooves. An annular web 16 radially connects the barrel to a radially outer annular part with an annular toothing 18. Of course, the toothing 18 and the splines 14 could be separated into two separate power transmission elements 10.

In operation, the splines 14 and the toothing 18 provide a power transmission that requires these parts to be made in materials with high mechanical strength, which explains why steel power transmission element 10 is usually manufactured. However, such power transmission elements 10 are relatively heavy.

Thus, it was then proposed to build a power transmission element 10 in two materials. The power transmission element 10 shown in FIG. 2 is a gearwheel here which consists of an annular web 16 made of aluminium and a toothing 18 made of steel. The annular web 16 and the toothing 18 are rigidly attached to each other by screwing 20.

If the realization principle of a power transmission element in two materials is interesting, the proposed design is problematic since it requires the integration of a screwed assembly. This technology is not desirable because it requires a machining for centering the barrel 12 with the web 16 to achieve the assembly thereof and guarantee the coaxiality of same. These centering machinings are intended to produce a radially outer annular face of the barrel 12 and a radially inner annular face on the web 16, the radially outer annular face of the barrel 12 and the radially inner face of the web 16 being intended to cooperate together to form a centering of the web 16 on the barrel 12.

Machining operations also include drilling circumferentially distributed holes through the web 16 and the toothing 18. The holes are traversed by fixing screws 20. This assembly with a plurality of elementary fixing points raises a reliability issue that can lead to disassembling the web 16 and the toothing 18.

In addition, the assembly and maintenance of the power transmission element requires traceability of its component parts, i.e. the barrel 12, the web 16, the toothing 18 and the fixing screws 20. Such traceability requires significant and costly logistics.

The invention aims to propose a solution for the construction of an annular power transmission element to overcome all or some of the disadvantages mentioned above.

SUMMARY

This document relates to a power transmission annular element having a longitudinal axis comprising a first annular part, a second annular part comprising torque transmission means and a third annular part integral with each other, the first annular part and the third annular part being made of a first metallic material, the second annular part being made of a second metallic material having a density greater than the density of the first metallic material, the second annular part being locked longitudinally between the first annular part and the third annular part and radially at least one of the first annular part and the third annular part.

The first annular part can be in contact with the third annular part. The first annular part can be directly attached to the third annular part. The first annular part can be welded to the third annular part.

The power transmission unit is made up of three parts that are structurally distinct from each other. Only the second annular part comprising torque transmission means requires to be made of a higher density material, the first part and the third part being made of less dense materials, which makes it possible to lighten the mass of the power transmission element. The first annular part and the third annular part are thus devoid of torque transmission means.

In addition, the locking of the second annular part with the first annular part and the third annular part is formed by the axial abutment of the second annular part on the first and third annular parts. These axial abutments prevent axial displacement of the second part and thus create a rigid assembly.

The welding of the first part to the third part can be a friction stir welding. This type of welding allows a rigid connection between two metal parts without any filler material.

Such a welding technique makes it possible to weld together metallic materials considered as unweldable using traditional welding techniques, which is the case for new types of aluminium alloys. More specifically, friction stir welding is a solid phase welding performed at temperatures below the melting temperature of a material and therefore avoids the formation of defects associated with a traditional welding. For example, defects related to poor solidification of the molten bath may be the formation of porosity or cracks.

Friction stir welding is considered to be the only process capable of welding the latest generation of aeronautical aluminium alloys.

Finally, friction stir welding produces welded joints with high mechanical characteristics, generally superior to those obtained by traditional fusion techniques.

The second annular part can cooperate by positive fitting with at least one of the first part and the third part for locking the second part in rotation with the first and second annular parts.

The presence of positive fitting cooperation means between the second annular part and the first and/or third annular part thus makes it possible to prevent any rotation of the second annular part and to lock it on the first and third annular parts.

The third part may include an annular part in radial annular contact with the first annular part and carrying fingers engaged in housings of the second annular part.

The positive fitting cooperation means may consist of engaging the fingers of the third annular part in openings forming housings of the second annular part.

The first annular part may include an annular shoulder on which the second annular part is longitudinally applied, the third annular part being longitudinally arranged opposite the shoulder with respect to the second annular part.

In a particular embodiment, the fingers can pass through the second annular part, the finger tips being welded to the annular shoulder.

The welds at the fingertips in contact with the shoulder of the first annular part and the weld between the wall at the radial contact between the first annular part and the third annular part stiffen the connection between the first and third annular parts that hold the second annular part in position.

Finger welding is preferably a friction stir welding, and more particularly a transparency welding which consists in first inserting a rotating mandrel through the first part until it comes into contact with the finger tips and thus welding the first annular part with at least the fingers of the third annular part.

The torque transmission means can be oriented radially outwards, the third annular part surrounding a cylindrical surface of the first annular part and being welded thereto.

The torque transmission means can thus be a toothing radially extending from the end of the power transmission element.

The third annular part may include an annular edge welded to an annular edge of the first annular part.

The arrangement and welding between the first annular part and the third part is carried out in such a way that the annular edge of the first annular part and the annular edge of the third annular part form a surface continuity, without any step. Preferably, this welding can be of the edge-to-edge type.

The torque transmission means can be oriented radially inward, the third annular part being mounted inside a cylindrical surface of the first part and welded thereto The torque transmission means can thus be splines extending radially inward from a radially inner surface of a barrel.

In a practical embodiment, the first metallic material can be an aluminum alloy. The second metallic material can be steel. The indication that the first annular part and the third annular part are made of a first metallic material does not mean that the material is strictly the same for the first annular part and the third annular part.

The invention will be better understood and other details, characteristics and advantages of the invention will appear when reading the following description, which is given as a non-limiting example, with reference to the attached drawings.

BRIEF DESCRIPTION OF THE FIGURES

FIG. 3A is a sectional half view of the power transmission element according to the invention, according to a first embodiment, along a cutting plane including the axis of the transmission element and not passing through a finger of the third annular part;

FIG. 3B is a half view of the power transmission element shown in FIG. 3A, along a cutting plane including the axis of the power transmission element and passing through one of the fingers of the third part;

FIG. 4A is a front view of the third part of the power transmission element, according to a first embodiment of the invention;

FIG. 4B is a side view of the third part of FIG. 4A;

DETAILED DESCRIPTION

Figure 1:
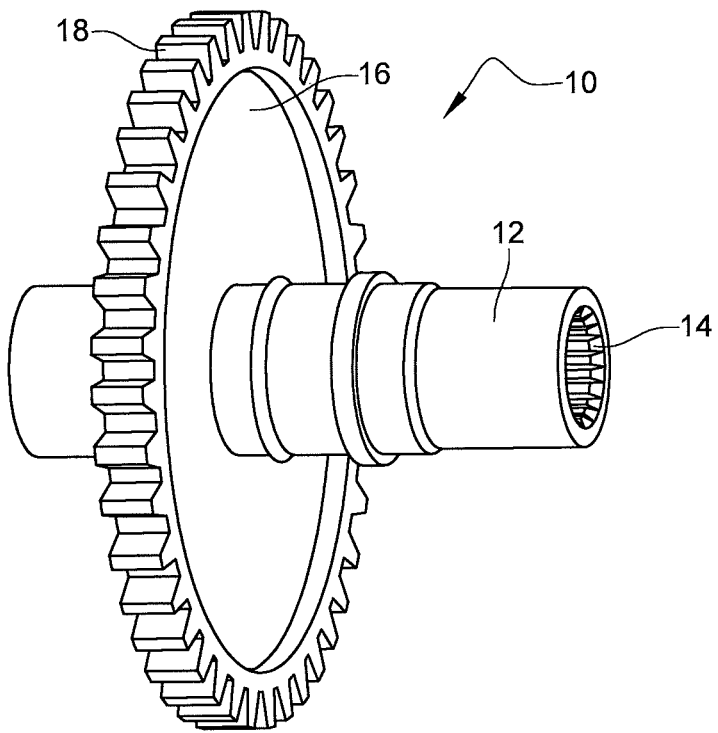
FIG. 1, already described above, is a perspective view of a first power transmission element of the prior art.
Figure 2:
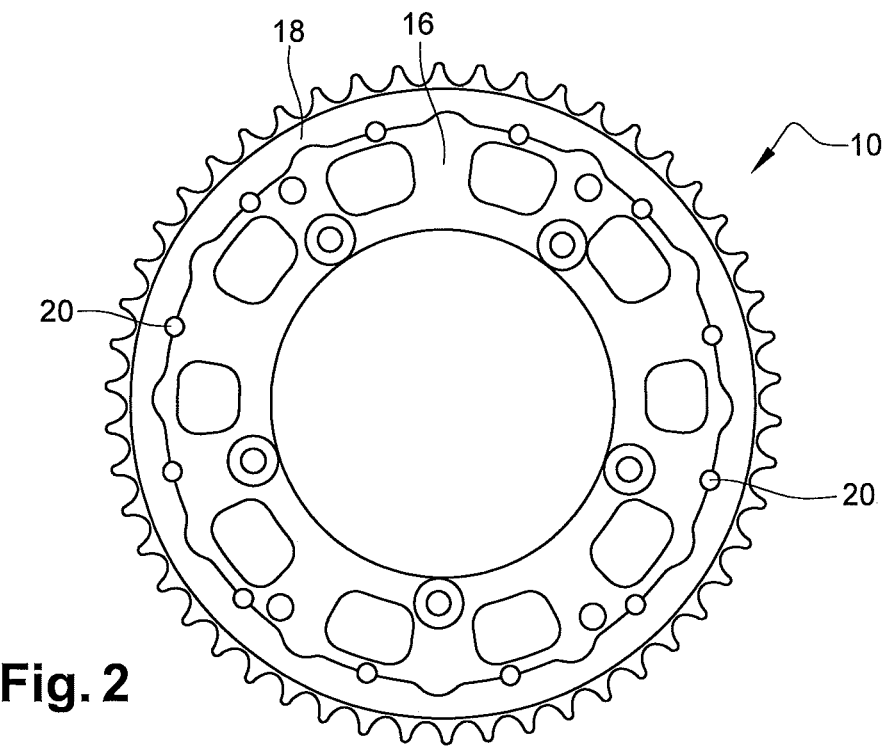
FIG. 2, already described above, is a front view of a second power transmission element of the prior art.
Figure 5:
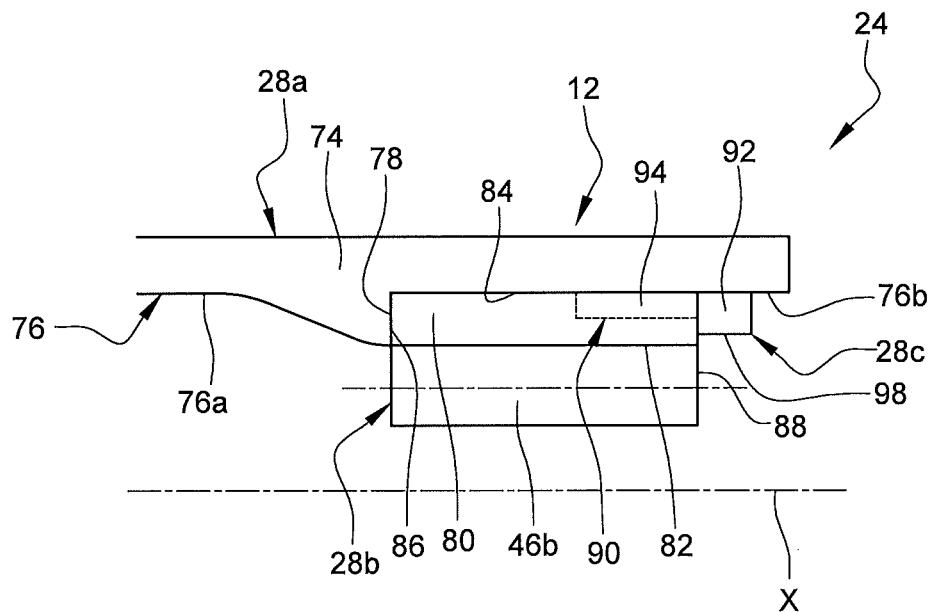
FIG. 5 is a sectional view of the power transmission element according to a second embodiment of the invention.
Figure 6:
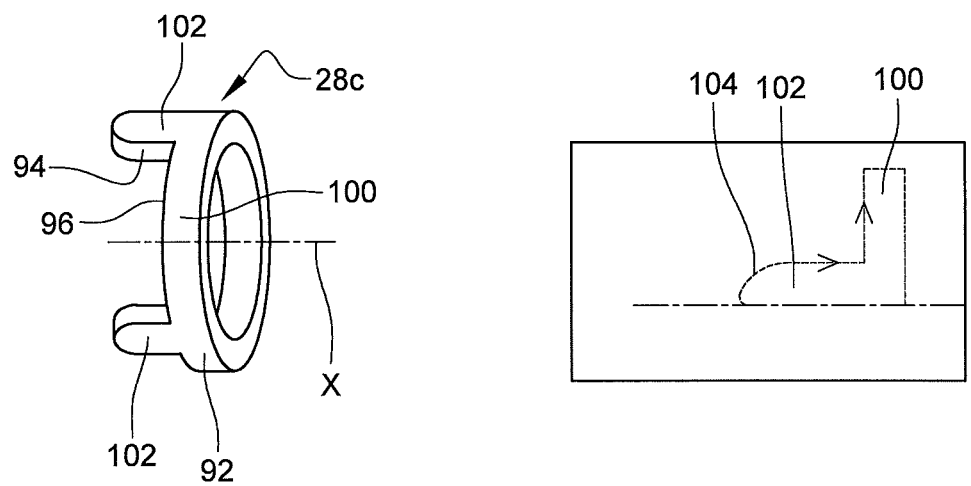
FIG. 6 is a perspective view of the third part of the power transmission element according to the second embodiment of the invention.
Figure 7:
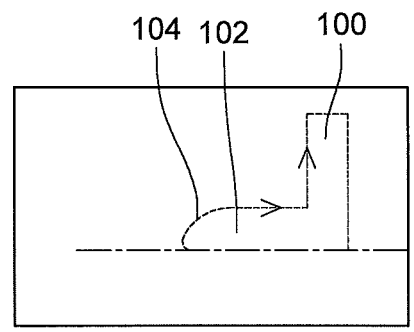
FIG. 7 is a sectional illustrating a welding path according to the second embodiment of the invention.

Two embodiments of the invention of an annular power transmission element 22, 24 will now be described, a first embodiment of the power transmission element 22 is illustrated in FIGS. 3A, 3B, 4A and 4B, and a second embodiment of the power transmission element 24 is illustrated in FIGS. 5, 6 and 7.

In each embodiment, the annular power transmission element 22, 24 comprises three annular parts coaxial along a longitudinal axis X, a first annular part 26a, 28a, a second annular part 26b, 28b and a third annular part 26c, 28c.

In each embodiment, the first part 26a, 28a, and the third annular part 26c, 28c are made of a metallic material with a lower density than the second annular part 26b, 28b. In particular, the first part 26a, 28a, and the third annular part 26c, 28c are made of an aluminium alloy and the second annular part 26b, 28b is made of steel.

In the first embodiment, the first annular part 26a comprises a tubular barrel 12, an annular web 16 comprising a first substantially radial inner annular wall 30 radially connected at its end to an annular allowance 32 in the axial direction. A second outer annular wall 34 radially extends outwards from a radially outer annular surface 36 of the annular allowance 32. The radially outer annular surface 36 of the allowance 32 is substantially cylindrical. The second radial annular wall 34 includes a radial annular face 38 forming an annular shoulder the advantage of which appears in the following description. It can be seen that the second outer radial annular wall 34 comprises a radially outer annular face 40 which is substantially cylindrical and which cooperates with the second annular part 26b as it will also appear more clearly later. It is therefore understood that the web 16 of the first annular part 26a includes the first radial annular wall 30, the annular allowance 32 and the second radial annular wall 34.

The second annular part 26b has a T-shaped section along to a cutting plane including the longitudinal axis. The second annular part comprises a radial annular wall 42 connected at its radially outer end to a cylindrical wall 44 bearing first torque transmission means 46a. The first torque transmission means 46a can be an annular toothing 18 designed to mesh with a toothing of another part. The cylindrical wall 44 comprises a radially inner cylindrical face 48 which is applied to the cylindrical face 40 of the second radial annular wall 34 of the web 16 of the first annular part 26a. The radial annular wall 42 of the second annular part 26b comprises a first radial annular face 50 and a second radial annular face 52, the first radial annular face 50 being applied to the radial annular face 38 forming the annular shoulder of the first part 26a. The radial annular wall 42 of the second annular part 26b comprises, at its radially inner end, an inner cylindrical face 54 which is applied to the cylindrical face 36 of the allowance 32 of the first annular part 26a. In addition, this radial annular wall 42 includes a plurality of longitudinally traversing housings 56.

In the particular case shown in FIGS. 3A to 4B, the housings 56 are notches and open radially inward. They are preferably evenly circumferentially distributed around the longitudinal axis X.

The radial abutments between the first annular part 26a and the second annular part 26b constitute means for centering the second annular part 26b with respect to the first annular part 26a.

The third annular part 26c comprises a ring 58 carrying a plurality of fingers 60 circumferentially distributed about the longitudinal axis X and protruding on a first radial annular face 62 of the ring 58. Once the fingers 60 of the third annular part 26c have been inserted into the annular housings 58, the latter come into abutment with the radial annular wall 38 constituting the shoulder of the first annular part 26a. When the fingers 60 are inserted into the housings 58, the first radial annular face 62 carrying the fingers 60 will be applied to the second radial annular face 52 of the radial annular wall 42 of the second annular part 26b. The ring 58 of the third annular part 26c further comprises a radially inner cylindrical face 64 and a radially outer cylindrical face 66. Once the fingers 60 have been inserted into the housings 58, the inner cylindrical face 64 of the third annular part 26c is radially applied to the cylindrical face 36 of the allowance 32 of the first annular part 26a and the outer cylindrical face 66 is radially applied to the inner cylindrical face 48 of the cylindrical wall 44 of the second annular part 26b.

The third annular part 26c comprises a second radial annular face 68, axially opposed to the first radial annular face 62 carrying fingers 60. The second radial annular face 68 of the third annular part 26c is flush with an axial end 70 of the allowance 32 of the first part 26a. Preferably, the end 70 of the allowance 32 is axially opposite the second radial wall 34 of the first annular part 26a. The second radial annular face 68 of the third annular part 26c and the axial end 70 of the allowance 32 form a surface continuity without any step.

The first and third annular parts 26a, 26c are welded together edge to edge at the radial abutment between the inner cylindrical face 64 of the third part 26c and the cylindrical face of the allowance 32 of the first annular part 26a.

The edge to edge welding is a friction stir welding. This welding implies that there is no weld seam on the flush faces of the first and third annular parts 26a, 26c. The edge to edge welding of the first and third annular parts 26a, 26c thus prevents any axial displacement of the second annular part 26b which is axially in abutment with same.

The fingers 60 of the third annular part 26c, which are in axial abutment with the radial annular face 38 forming the shoulder of the first annular part 26a, each have a radial face 72 which is welded to the radial annular face 38 forming the shoulder of the first annular part 26a.

This welding is preferably a friction stir welding, which consists in inserting a mandrel through the first annular part 26a until it comes into contact with the ends 72 of the fingers 60 and thus welds them together.

Once the first and third annular parts 26a, 26c have been welded, the fingers 60 of the third part 26c inserted in the housings 58 of the second part 26b make it possible to prevent any rotation of the second part 26b with respect to the first and third parts 26a, 26c along the longitudinal axis X.

In the particular case shown in FIGS. 3A to 4B, the second annular part 26b has three housings 58 and the third annular part 26c has three fingers 60 each cooperating with one of the housings 58.

In the second embodiment, the power transmission element 24 comprises a barrel 12 which is formed by a first annular part 28a, a second annular part 28b and a third annular part 28c.

The first annular part 28a includes a tubular wall 74. The tubular wall has an inner cylindrical face 76. The inner cylindrical face 76 comprises a first inner cylindrical face 76a and a second inner cylindrical face 76b. The first and second inner cylindrical faces 76a, 76b are connected to each other by a radial annular wall 78, forming a shoulder with the second inner cylindrical wall 76b, the advantage of which appears in the following description.

The second annular part 28b comprises a tubular wall 80 the inner cylindrical face of which has second torque transmission means 46b. The second torque transmission means 46b may be splines 14 designed to cooperate with corresponding splines of a shaft. The tubular wall 80 comprises a radially outer cylindrical face 84 which is applied to the second cylindrical face 76b of the first annular part 28a. The second annular part 28b also includes a first radial annular face 86 which is applied to the radial annular wall 78 forming the shoulder of the first part 28a. The second annular part 28b comprises a second radial annular face 88, axially opposed to the first radial annular face 86. The second radial annular face 88 has a plurality of axially extending blind housings 90. The blind housings 90 open radially to the outside.

The third annular part 28c comprises a ring 92 carrying a plurality of fingers 94 circumferentially distributed about the longitudinal axis X and protruding on a radial annular face 96 of the ring 92. The ring 92 also includes a radially inner cylindrical face 98 and a radially outer cylindrical face 100. The fingers 94 each have an outer cylindrical face 102 which axially extends in the extension of the outer cylindrical face 100 of the ring 92 of the third annular part 28c.

Once the fingers 94 of the third annular part 28c have been inserted into the blind housings 90 of the second annular part 28b, the radial annular face 96 carrying the fingers 94 axially comes in abutment on the second radial annular face 88 of the second annular part 28b, provided with the blind housings 90. The outer cylindrical face 102 of the fingers 94 and the outer cylindrical face 100 of the ring 92 of the third annular wall 28c annularly come in radial abutment on the second inner cylindrical face 76b of the first annular part 28a.

The outer cylindrical faces 100, 102 of the fingers 94 and the ring 92 of the third annular part 28c are welded to the second inner cylindrical face 76b of the first annular part 28a. Such welding is preferably a transparent friction stir welding.

The mandrel thus preferably fits a periphery 104 of the radial abutment zones between the first and third annular parts 28a, 28c, as shown in FIG. 7.

The welding of the first and third annular parts 28a, 28c thus prevents any axial displacement of the second annular part 28b which is axially in abutment with same.

The presence of the fingers 94 of the third part 28c inserted in the housings 90 of the second part 28b prevents any rotation of the second part 28b with respect to the first and third annular parts 28a, 28c along the longitudinal axis X.

In one embodiment not shown in the figures, the power transmission element 22, 24 could include first torque transmission means 46a according to the first embodiment and second torque transmission means 46b according to the second embodiment.

The invention claimed is:

1. An annular power transmission element having a longitudinal axis, the annular power transmission element comprising a first annular part, a second annular part comprising torque transmission means and a third annular part integral with each other, the first annular part and the third annular part comprising a first type of metallic material, the second annular part comprising a second type of metallic material having a density greater than the density of the first type of metallic material, the second annular part being locked longitudinally between the first annular part and the third annular part and radially on at least one of the first annular part and the third annular part, the second annular part cooperating by positive fitting with at least one of the first annular part and the third annular part for the rotational locking of the second annular part with the first and third annular parts, and the third annular part comprising an annular portion in radial annular contact with the first annular part and carrying fingers engaged in housings of the second annular part.

2. The annular power transmission element of claim 1, wherein the first annular part is in contact with the third annular part and directly attached thereto.

3. The annular power transmission element of claim 1, wherein the first annular part comprises an annular shoulder on which the second annular part is longitudinally applied, the third annular part being longitudinally arranged opposite the annular shoulder with respect to the second annular part.

4. The annular power transmission element of claim 3, wherein the fingers pass through the second annular part, the ends of the fingers being welded to the annular shoulder.

5. The annular power transmission element of claim 1, wherein the torque transmission means is oriented radially outward and the third annular part surrounds a cylindrical surface of the first annular part and is welded thereto.

6. The annular power transmission element of claim 5, wherein the third annular part comprises an annular edge welded to an annular edge of the first annular part.

7. The annular power transmission element of claim 1, wherein the torque transmission means is oriented radially inward, the third annular part being mounted within a cylindrical surface of the first annular part and welded thereto.

8. The annular power transmission element of claim 1, wherein the metallic material of the first type is an aluminum alloy.

9. The annular power transmission element of claim 1, wherein the metallic material of the second type is steel.

10. The annular power transmission element of claim 1, wherein the first annular part is welded to the third annular part.

11. The annular power transmission element of claim 10, wherein the first annular part is welded to the third annular part with a friction stir welding.

* * * * *